No. 678,396. Patented July 16, 1901.
S. HAMPTON.
ROTARY PLOW.
(Application filed Sept. 29, 1900.)
(No Model.) 2 Sheets—Sheet 2.
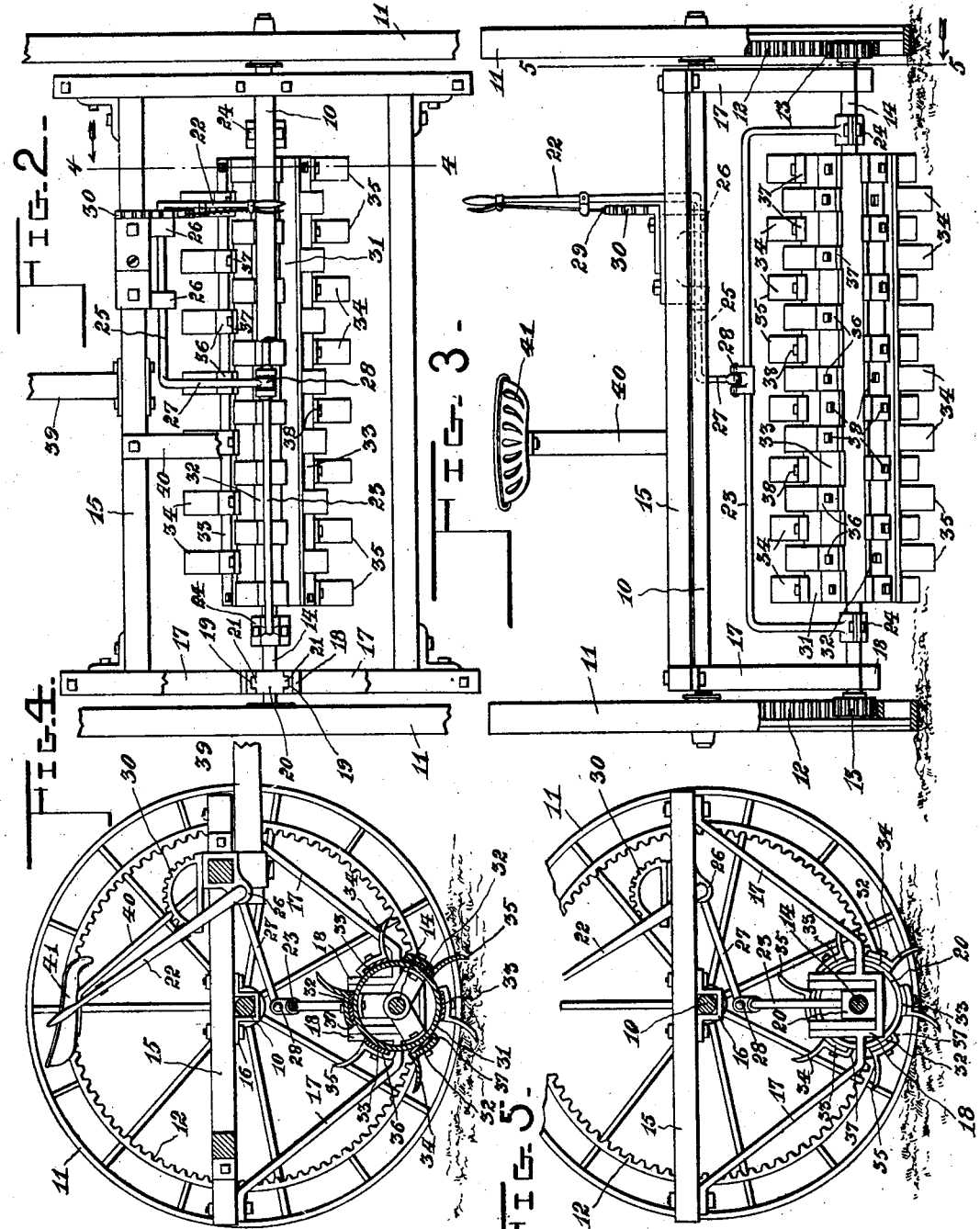
Witnesses: Samuel Hampton, Inventor
By Marion Marion
Attorneys

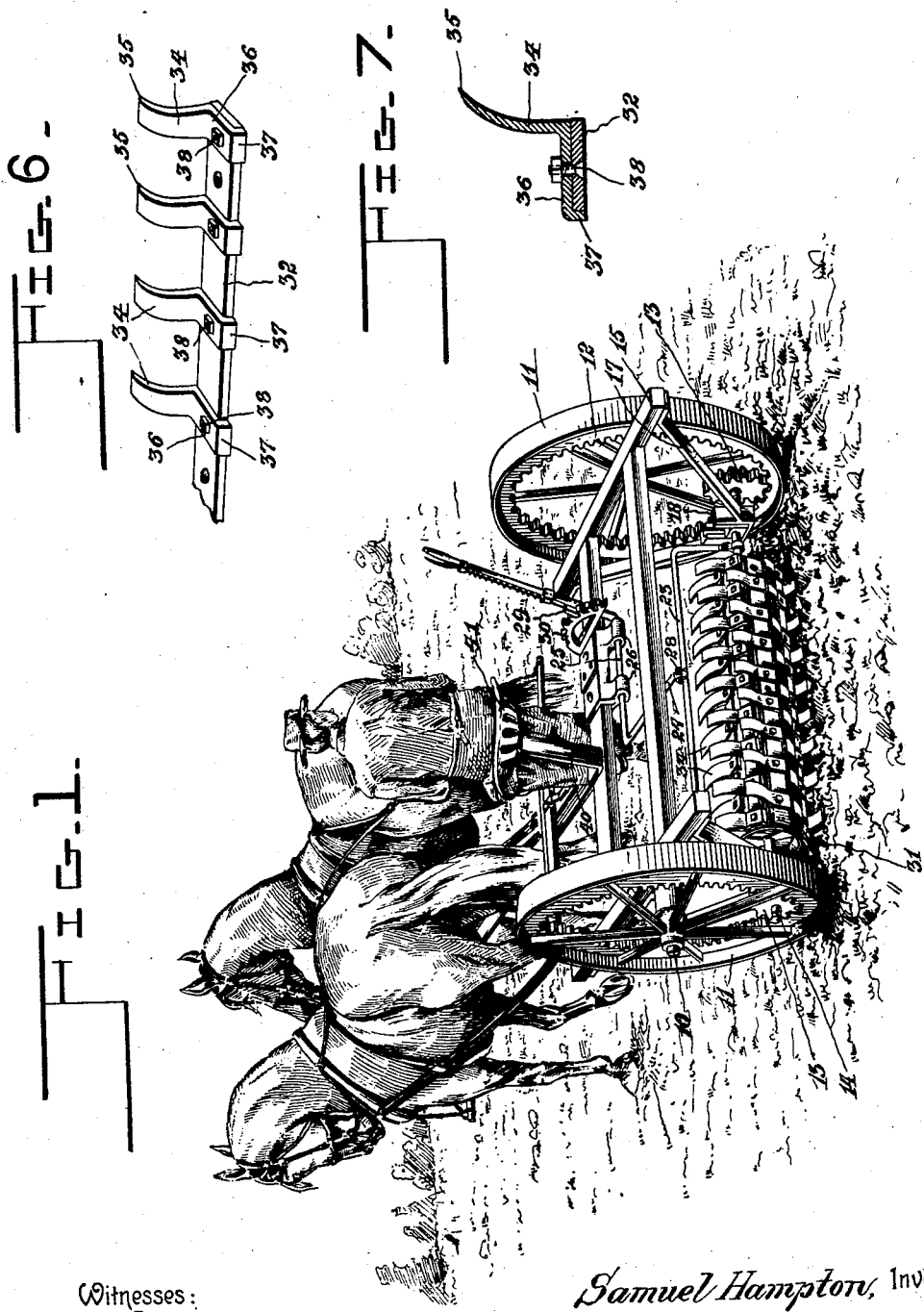

UNITED STATES PATENT OFFICE.

SAMUEL HAMPTON, OF RAPID CITY, CANADA, ASSIGNOR OF ONE-HALF TO ROBERT A. NELLES, OF SAME PLACE.

ROTARY PLOW.

SPECIFICATION forming part of Letters Patent No. 678,396, dated July 16, 1901.

Application filed September 29, 1900. Serial No. 31,484. (No model.)

*To all whom it may concern:*

Be it known that I, SAMUEL HAMPTON, a subject of Her Majesty the Queen of Great Britain, residing at Rapid City, county of Minnedosa, Province of Manitoba, Canada, have invented certain new and useful Improvements in Rotary Plows; and I do hereby declare that the following is a full, clear, and exact description of the invention, such as will enable others skilled in the art to which it appertains to make and use the same.

My invention relates to improvements in rotary plows; and one object that I have in view is the provision of a simple and inexpensive machine which is designed to break, cultivate, or till the land thoroughly and expeditiously, so that no harrowing or further cultivation will be required to prepare the land for the reception of seed—that is to say, the soil will be cultivated and ready to receive the seed immediately after its treatment by the machine.

The machine of my invention is also especially adapted for the destruction of weeds and other vegetable growths, because it includes means for chopping down the weeds and other obstructions in its path.

A further object of the invention is the provision of a rotary cutter mechanism in which several parts are arranged to meet with minimum resistance in cultivating the land, thus contributing to the ease and lightness of draft, and, furthermore, to associate with the cutter mechanism a means for adjusting the latter out of operative position.

Further objects and advantages of the invention will appear in the course of the subjoined description, and the novelty in the combination of devices and in the construction and arrangement of parts will be defined by the claims.

In the drawings hereto annexed and forming part of this specification, Figure 1 is a perspective view of my improved rotary plow looking at the rear thereof. Fig. 2 is a plan view with the wheels and draft-tongue partly broken away and also having one side of the frame broken out to show a part of the construction. Fig. 3 is a view in rear elevation of the machine with the ground-wheels partly broken away and in section to show the intermeshing engagement of the cylinder-axle with the master-gears. Fig. 4 is a vertical cross-section in the plane of the dotted line 4 4 on Fig. 2 looking in the direction of the arrow. Fig. 5 is another vertical cross-section, which, furthermore, is taken in the plane of the dotted line 5 5 on Fig. 3, also looking in the direction of the arrow. Fig. 6 is a detail perspective view of one knife-bar removed from the cutter cylinder or drum. Fig. 7 is a transverse section through one cutter-bar and a knife which is bolted thereto.

The same numerals of reference denote like parts in each of the several figures of the drawings.

10 designates the machine-axle, which is provided at its ends with wheel-spindles adapted for the reception of the carrying-wheels 11. Each carrying-wheel has provided within its tire an internally-toothed master-gear 12, with which meshes one of two gear-pinions 13, the latter being secured on opposite ends of a cylinder-shaft 14. This cylinder-shaft is arranged in a horizontal position to extend across the width of the machine from one ground-wheel to the other, and said cylinder-shaft is preferably arranged below and in the vertical plane of the machine-axle 10, as represented by Figs. 4 and 5.

15 designates a main frame, which may be of any desired construction, said frame being provided on its under side with the keeper 16, adapted to embrace the axle 10. As shown in the drawings, this machine-frame consists of suitable cross-rails and front and back side rails, all substantially joined together to present a rectangular outline, said frame being arranged, preferably, in a horizontal position; but the construction of this frame is not material to the present invention. Hence the right to modify the frame within wide limits is reserved. To opposite end portions of the main frame 15 are secured the hangers 17, which are bolted firmly to the frame and are arranged in parallel positions at the opposite end portions of said frame. The hangers are formed or provided with the guide-boxings 18, arranged, as shown by Fig. 5, to stand upwardly from the lower portion of the hangers, and these boxings of the two hangers are arranged in alinement with each other across the machine. Said guide-boxings are provided on opposite sides thereof with the guideways 19, arranged in opposing relation, as shown by Fig. 2, and in the boxings are slidably fitted the shaft-bearings 20, the latter having flanges 21, adapted to slidably fit in the guideways 19, as indicated by Figs. 2 and 5. In these slidable bearings 20 is journaled the end portions of the cylinder-shaft 14, and these bearings, with the cylinder-shaft, are adapted to be raised or lowered through suitable connecting means with a hand-lever 22. A bail 23 is arranged to straddle the cylinder or drum, which is mounted on the shaft 14, as shown by Fig. 3, so that the end portions of said bail may be clipped on the cylinder-shaft 14, as at 24, the points of engagement between the bail and the cylinder-shaft being at opposite ends of the cylinder, as shown by Fig. 3. The lever 22 is made fast with one end portion of a rock-shaft 25, the latter being journaled in suitable bearings 26, provided at the front side rail of the machine-frame 15, and this rock-shaft is provided at its opposite end with a rearwardly-extending arm 27, which has pivotal connection, as at 28, with said bail 23. The lever 22 is furnished with a suitable latch 29, that is adapted to engage with either of a series of notches provided in the segment 30, the latter being suitably secured on the machine-frame. The means for slidably supporting the cylinder-shaft 14 below the machine-frame, taken in connection with the lever which has operative connection through the bail with the cylinder-shaft, afford a convenient adjusting mechanism by which the cylinder-shaft may be lowered for the gear-pinions 13 thereon to have intermeshing engagement with the master-gears 12 of the ground-wheels, whereby the cylinder may be rotated very rapidly, owing to the proportion of the gear-pinions to the master-gears. I would have it understood, however, that I do not desire to limit myself to this specific embodiment of mechanism for adjusting the rotary cutter-cylinder, because I am aware that different forms of such adjusting mechanism may be used in connection with the cutter-cylinder for the purpose of moving it into or out of gear.

I will now proceed to describe the construction of the rotary cutter which is carried by the shaft 14 of the machine. This cutter consists of a drum or cylinder 31, a series of knife-bars 32 33, and a series of blades 34, secured on each knife-bar. The cylinder 31 may be in the form of a solid cylindrical drum, as shown more clearly by Fig. 4, or this drum may be skeletonized, so as to reduce the weight and provide for the free passage of the soil therethrough. The knife-bars 32 33 are arranged longitudinally and upon or against the drum 31, said bars being disposed equidistant one from the other and attached to the drum by bolts or other suitable fastenings. The bars 32 alternate with the bars 33, and each bar 32 or 33 has a series of blades 34 attached thereto. The blades on the bars 32 differ in number from the blades on the bars 33, and the blades on one bar are thus arranged to alternate with the blades on the adjoining bars, whereby the cylinder is equipped with rows of blades disposed in staggered relation, which reduces the aggregate number of blades, so as to lighten the weight of the cylinder and at the same time secure such a disposition of the cutting-surfaces on the cylinder as to secure efficiency in the operation of tilling the soil. As shown more clearly by Figs. 6 and 7, each blade is curved in the direction of its length so as to terminate in a bit 35, said blade having a shank 36, which is flanged, as at 37, in order to firmly embrace the knife-bar, a bolt 38 being employed for the purpose of securing the blade-shank firmly to the bar in a detachable manner. The shank of the blade is seated firmly against one face of the bar, while its flange embraces the edge of the bar, thus disposing the blade in such a position that it will not work loose when properly clamped by the nut and bolt.

By reference to Figs. 4 and 5 it will be seen that the curved blades of the rapidly-revoluble drum or cylinder extend therefrom on approximately tangential lines, so as to enter the soil easily and readily. This curvature of the blades taken in connection with the staggered arrangement thereof on the cylinder or drum produces a revoluble cutter in which the parts operate in a way to meet with minimum resistance in tilling the soil, whereby the blades may be said to shave the land to the depth of three or more inches, depending, however, upon the length of the blades and the adjustment of the drum or cylinder. In addition to securing lightness in the weight of the cylinder, the staggered relation of the blades and the curvature thereof enable the cylinder to efficiently till or cultivate the land in a way to reduce the draft on the machine, thereby decreasing the power required for hauling the machine across the field.

As is usual in implements of this character, a draft-tongue 39 is attached to the central part of the machine-frame, and a seat-standard 40 is also bolted to the machine-frame and provided with a seat 41 for the accommodation of the driver.

It is evident that any one of the series of knife-bars may, with the knives secured thereto, be removed from the cylinder or drum when it is desired to replace either the bar or the knives thereon, and it is equally evident that any worn or broken blade may be detached from the knife-bar without removing the latter from the drum, because the bolt-nut which fastens the blade independently to the knife-bar is readily accessible from the outside of the cylinder.

It is thought that the operation and advantages of this invention will be readily understood from the foregoing description, taken in connection with the drawings.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

Having thus described my invention, what I claim as new is—

1. In a rotary plow, a cutter mechanism comprising a drum or cylinder, a series of longitudinal bars secured removably to said drum, and a plurality of series of blades secured to said bars with the blades of each bar staggered relatively to the blades on adjacent bars, each blade having an angular heel embracing its bar and secured removably thereto, substantially as described.

2. In a rotary plow, a revoluble cutter mechanism comprising a drum, a series of bars secured longitudinally on said drum and removable individually therefrom, and a plurality of series of blades, each series of blades secured to one bar for removal therewith from the drum and with each individual blade provided with an angular heel embracing and removably secured to one of said bars, substantially as described.

3. In a rotary plow, a revoluble cutter mechanism comprising a drum, a series of bars thereon, and a plurality of series of blades attached to the bars, each blade being curved longitudinally and formed at its heel with an offstanding shank which embraces said bar and is fastened removably thereto, substantially as described.

In witness whereof I have hereunto set my hand in the presence of two witnesses.

SAMUEL HAMPTON.

Witnesses:
DAVID MILNE,
J. B. M. DUNOON.